(12) United States Patent
Palzer et al.

(10) Patent No.: US 11,232,362 B2
(45) Date of Patent: Jan. 25, 2022

(54) METHOD AND DEVICE FOR PRESENTING SUGGESTED RECOMMENDED OPERATION ACTIONS OF A SUGGESTION SYSTEM AND INTERACTION WITH THE SUGGESTION SYSTEM

(71) Applicant: VOLKSWAGEN AG, Wolfsburg (DE)

(72) Inventors: Daniel Palzer, Berlin (DE); Helge Schäfer, Lehrte (DE)

(73) Assignee: Volkswagen AG

( * ) Notice: Subject to any disclaimer, the term of this patent is extended or adjusted under 35 U.S.C. 154(b) by 699 days.

(21) Appl. No.: 15/911,234

(22) Filed: Mar. 5, 2018

(65) Prior Publication Data
US 2018/0253652 A1    Sep. 6, 2018

(30) Foreign Application Priority Data
Mar. 6, 2017    (DE) ...................... 10 2017 203 570.6

(51) Int. Cl.
*G06N 5/02*    (2006.01)
*B60K 35/00*    (2006.01)
(Continued)

(52) U.S. Cl.
CPC ............... *G06N 5/02* (2013.01); *B60K 35/00* (2013.01); *G06F 3/0481* (2013.01);
(Continued)

(58) Field of Classification Search
CPC .. G06F 3/0481; G06F 3/0488; G06F 3/04883; B60K 2370/164; B60K 35/00;
(Continued)

(56) References Cited

U.S. PATENT DOCUMENTS 9,841,879 B1 * 12/2017 Gray ...................... G06F 3/0484
10,181,099 B2 * 1/2019 Penilla ...................... G09G 5/14
(Continued)

FOREIGN PATENT DOCUMENTS

DE    102013223684 A1    5/2015
EP        2925027 A1    9/2015
(Continued)

OTHER PUBLICATIONS

Office Action for Korean Patent Application No. 10-2018-0025865; dated Feb. 11, 2019.
(Continued)

*Primary Examiner* — Abdullah Al Kawsar
*Assistant Examiner* — Kenny Nguyen
(74) *Attorney, Agent, or Firm* — Barnes & Thornburg LLP

(57) ABSTRACT

A method to present recommended operator actions of a suggestion system and to provide interaction with the suggestion system. Recommendations for two or more software applications are generated. Display and control elements for the recommendations of the two or more software applications are jointly displayed and an activation of one of the jointly displayed display and operating elements is detected. The software application assigned to the activated display and control element is opened and display and control elements are jointly displayed, each of which represent one of several recommended operator actions for the opened software.

9 Claims, 8 Drawing Sheets

(51) Int. Cl.
*G06F 3/0488* (2013.01)
*G06F 3/0481* (2013.01)
*H04M 1/72403* (2021.01)
*H04M 1/72472* (2021.01)
*G06N 7/00* (2006.01)

(52) U.S. Cl.
CPC ........ *G06F 3/0488* (2013.01); *G06F 3/04883* (2013.01); *G06N 7/005* (2013.01); *H04M 1/72403* (2021.01); *H04M 1/72472* (2021.01); *B60K 2370/161* (2019.05); *H04M 2250/22* (2013.01)

(58) Field of Classification Search
CPC .... B60K 2370/161; G06N 5/02; G06N 7/005; H04M 1/72403; H04M 1/72472; H04M 2250/22; B60R 11/0252
See application file for complete search history.

(56) References Cited

U.S. PATENT DOCUMENTS

| | | | | |
|---|---|---|---|---|
| 10,474,322 | B2* | 11/2019 | Lee | H04N 21/4122 |
| 10,531,227 | B2* | 1/2020 | Aggarwal | G06F 16/9535 |
| 10,747,554 | B2* | 8/2020 | Chung | G06F 3/04817 |
| 2008/0163112 | A1* | 7/2008 | Lee | G06F 3/0482 |
| | | | | 715/810 |
| 2010/0122194 | A1* | 5/2010 | Rogers | G06F 3/0482 |
| | | | | 715/769 |
| 2011/0072393 | A1* | 3/2011 | Wilairat | G06F 9/451 |
| | | | | 715/811 |
| 2013/0014040 | A1 | 1/2013 | Jagannathan et al. | |
| 2014/0101617 | A1* | 4/2014 | Yang | G06K 9/00288 |
| | | | | 715/846 |
| 2014/0309868 | A1 | 10/2014 | Ricci | |
| 2015/0046028 | A1 | 2/2015 | Sprickmann Kerkerinck et al. | |
| 2015/0160019 | A1 | 6/2015 | Biswal et al. | |
| 2015/0301793 | A1 | 10/2015 | Craig et al. | |
| 2016/0068169 | A1 | 3/2016 | Goldman-Shenhar et al. | |
| 2016/0202869 | A1* | 7/2016 | Kim | G06F 1/1626 |
| | | | | 715/841 |
| 2016/0216852 | A1* | 7/2016 | Lee | G06F 3/04842 |
| 2016/0291831 | A1* | 10/2016 | Baek | G06F 3/04817 |
| 2016/0306511 | A1* | 10/2016 | Park | G06F 3/04842 |
| 2016/0360382 | A1 | 12/2016 | Gross et al. | |
| 2017/0103327 | A1* | 4/2017 | Penilla | G06F 3/04842 |
| 2017/0168667 | A1* | 6/2017 | Jeon | H04N 21/43615 |
| 2017/0277396 | A1* | 9/2017 | Chung | G06F 9/451 |
| 2018/0075490 | A1* | 3/2018 | Chintalapoodi | G06K 9/00302 |
| 2018/0109920 | A1* | 4/2018 | Aggarwal | H04L 69/28 |
| 2019/0126942 | A1* | 5/2019 | Goto | B60Q 9/00 |

FOREIGN PATENT DOCUMENTS

| | | |
|---|---|---|
| EP | 2937771 A1 | 10/2015 |
| KR | 20140045549 A | 4/2014 |
| KR | 20140074339 A | 6/2014 |
| WO | 2015103374 A1 | 7/2015 |

OTHER PUBLICATIONS

Search Report for German Patent Application No. 10 2017 203 570.6, dated Nov. 13, 2017.

* cited by examiner

METHOD AND DEVICE FOR PRESENTING SUGGESTED RECOMMENDED OPERATION ACTIONS OF A SUGGESTION SYSTEM AND INTERACTION WITH THE SUGGESTION SYSTEM

PRIORITY CLAIM

This patent application claims priority to German Patent Application No. 10 2017 203 570.6, filed 6 Mar. 2017, the disclosure of which is incorporated herein by reference in its entirety.

SUMMARY

Illustrative embodiments relate to a method for displaying recommended operator actions of a suggestion system and for interaction with the suggestion system, which can be used in a graphical user interface in a transportation vehicle. Illustrative embodiments also relate to a device for implementing the method and to a transportation vehicle for embodying such a method or such a device.

BRIEF DESCRIPTION OF THE DRAWINGS

Disclosed embodiments will become apparent from the following description and the claims in conjunction with the figures, in which:

DETAILED DESCRIPTION

Figure 1:
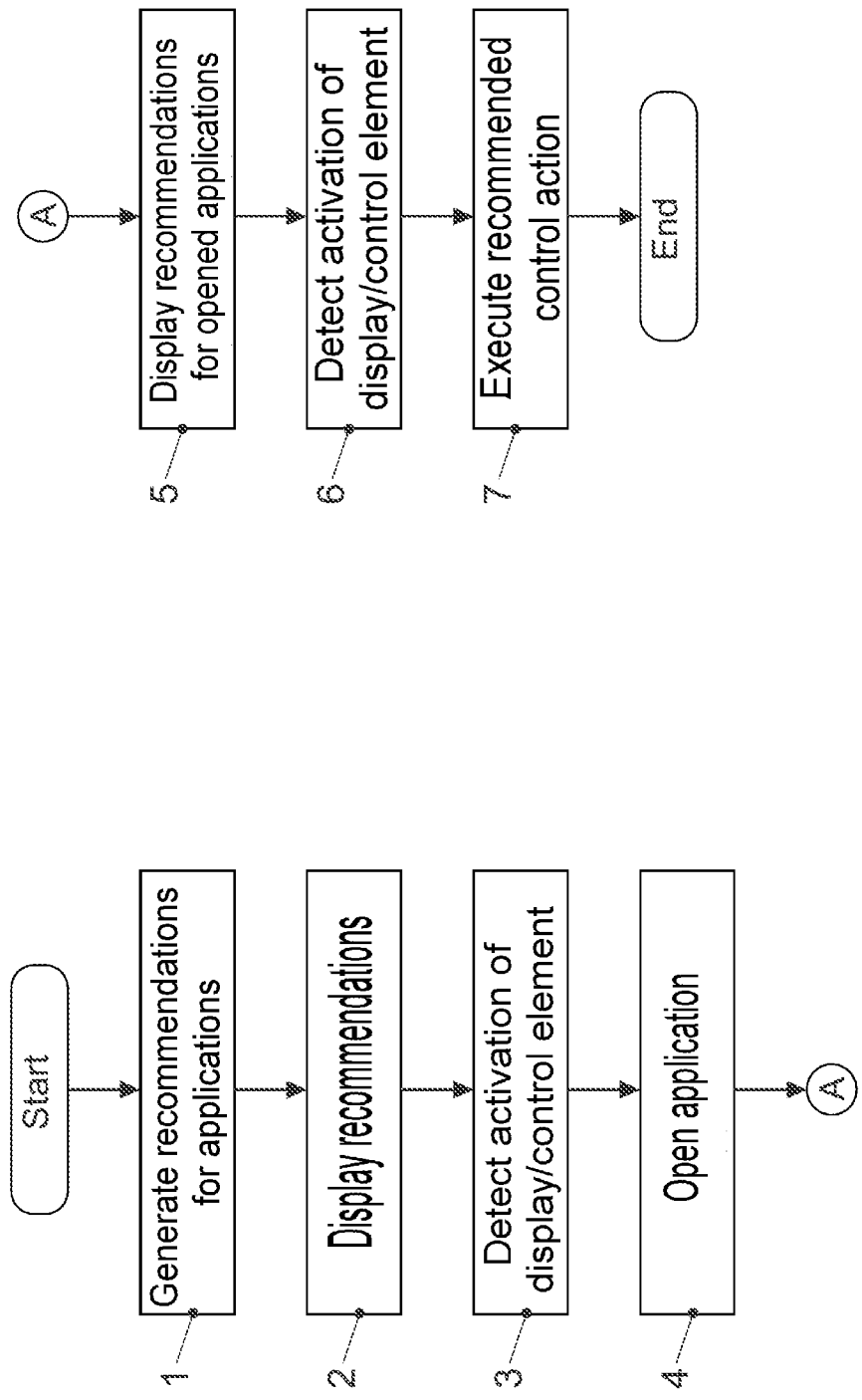
FIG. 1 shows a flow diagram for the disclosed method for displaying recommended control actions of a suggestion system and interaction with the suggestion system.

In many areas of technology, to allow interaction with machines and equipment, user interfaces (abbreviated to HMI for "Human Machine Interface") are used, wherein graphical user screens or user interfaces (abbreviated to GUI for "Graphical User Interface") are now very commonly used. Graphical user interfaces allow graphical elements and complex operating processes to be displayed on a monitor screen. An operation can be effected by a plurality of different input devices, for example, by touching a touch-sensitive display screen, a so-called touchscreen.

To allow the interaction, control elements, for example, graphical symbols, so-called icons, are frequently displayed on GUIs. One of these control elements can be dialed up or selected by the user, and it is then in the focus for the next input. This can be made visible to the user, by the dialed-up or selected control element being graphically highlighted, which is beneficial if more than one dialable or selectable control elements are displayed. Larger icons with a higher level of detail are frequently also referred to as tiles, wherein these are usually rectangular in shape and, a plurality of tiles can be arranged on a tile surface on a working surface, or a so-called home screen. Icons and tiles are usually associated with software programs or software applications, or applications or "apps" for short, which can be launched and operated by selecting an icon or a tile.

In the case of a GUI an with extensive functionality or a plurality of functionalities, a plurality of control elements may be necessary, which may mean that not all control elements can be displayed simultaneously in a meaningful way, or the clarity and usability of the GUI suffers.

For example, in the case of the use of these GUIs in the automotive field, due to the increasing functionality and setting options in the infotainment, communications, safety and comfort areas, this is the case. In the display of information or a control that is directed to the driver of a transportation vehicle while driving, this should be as simple and intuitive as possible to minimize any distraction from the driving task and so ensure driving safety.

To improve the clarity of the display it is known to provide hierarchical menus with a plurality of sub-levels. This can render the navigation in the menu and the location of less commonly used functions difficult for the user, for example, for the driver of a transportation vehicle. Context-sensitive menus can provide limited assistance here, but they require a selection of the desired display or operation by the user. Finally, the activation and deactivation of functions, for example, in a configuration menu, is not necessarily easy for the user either and requires manual intervention.

The ease of use can be increased by detecting the user behavior and the usage situation, to adapt or automate the operation to suit the particular situation based on this, or to provide the user with recommendations for the operation. For the driver of a transportation vehicle, this can also reduce the distraction or interference.

A method and a device for giving recommendations for multiple transportation vehicle occupants are disclosed in DE 10 2013 223 684 A1. In this case, the occupants of the transportation vehicle identified and the information on the preferences for the identified occupants is retrieved. This preference information is based on a previous observation of the occupants and enables recommendations to be given which are displayed or presented acoustically, for example, to be accepted or rejected by the occupants. It can also be provided that a plurality of options is offered as a recommendation, among which the occupants dial up one option, or can reject all options.

In addition, US 2016/0068169 A1 a system and a method for the suggestion and automation of actions in a transportation vehicle are described, wherein recommendations are given if an improved behavior is available. Similarly US 2015/0160019 A1 discloses a transportation vehicle-internal computer system which automatically executes actions to ensure that the cognitive load on the driver is not too high. For example, an incoming phone call can be automatically rejected and information about this can displayed to the driver.

Disclosed embodiments provide a method and a device for presenting suggested recommended operator action of a suggestion system and interaction with the suggestion system that structures and clearly presents the generated suggestions for a user and can be used in a transportation vehicle.

Disclosed embodiments provide a method or a corresponding device.

The disclosed method for the presentation of recommended operator action of a suggestion system and interaction with the suggestion system comprises the following operations:

generating recommendations for two or more software applications;

joint display of one display and control element for each of the recommendations of the two or more software applications;

detecting an activation of one of the jointly displayed display and control elements;

opening the software application, which is assigned to the activated display and control element;

joint display of a plurality of display and operating elements, each of which represents one of a plurality of recommended control actions for the opened software application.

According to at least one disclosed embodiment, the joint display of the display and control elements for the two or more software applications takes place on a global display level and the joint display of the display and control elements for the plurality of recommended control actions for the opened software application takes place on an application display level subordinate to the global display level. Distinguishing between the display location on a global level on the one hand and an application display level on the other means that a plurality of suggestions can be presented to the user, thus ensuring the clarity of the suggestion system.

A display and control element for a recommendation of a software application, in addition to a recommendation to open a software application, also represents a recommended control action for this software application.

Furthermore, recommendations for control actions of the two or more software applications are generated, probability values for the execution of the recommended control actions are determined and in each case a display and control element, which represents the recommended operator action with the highest current probability value for the respective software application, is displayed on the global display level for the two or more software applications.

In this process, the display and control elements displayed for the opened software application may be displayed on the application display level ranked according to the probability values for the execution of the recommended control actions.

The probability value for the execution of the recommended control action is determined from the previous user behavior and/or external parameters, wherein the external parameters for determining the probability value can comprise the current time and/or the current position of the user.

According to a disclosed embodiment, upon detection of the activation of this display and control element, the recommended software application is opened and the recommended control action for this software application is executed automatically, in the case of a second control action different from the first control action, the recommended software application is rejected and in the case of a third control action different from both of the first control actions, the recommended software application is opened and a recommendation for one or more control actions is displayed.

In this case it is beneficial if the display and control elements are presented on a touch-sensitive display and the first control action corresponds to tapping on a display and control element displayed, the second control action corresponds to an upward swipe movement and the third operator action corresponds to a downward swipe movement on one of the display and control elements displayed.

Accordingly, for presenting recommended control actions of a suggestion system and for interaction with the suggestion system, a disclosed device comprises a recommendation unit, an image generation unit, a display, a computer unit and a detection unit, wherein the recommendation unit generates recommendations for two or more software applications;

the image generation unit controls the display such that one display and control element for each of the recommendations of the two or more software applications is displayed jointly on a global display level;

the detection unit detects an activation of one of the presented display and control elements;

the software application which is assigned to the activated display and control element is opened on the computer unit; and the image generation unit then activates the display such that a plurality of display and control elements, each of which represents one of a plurality of recommended operator actions for the open software application, are displayed together.

The disclosed device can be provided in a transportation vehicle, wherein the suggestion system recommends control actions for an infotainment system of the transportation vehicle.

For a better understanding of the principles of the present disclosure, embodiments are described in more detail below by reference to the figures. It goes without saying that the disclosure is not limited to these embodiments and that the described features can also be combined or modified without departing from the scope of protection of the disclosure, as it is defined in the claims.

FIG. 1 shows a flow diagram of the disclosed method. In a first operation at 1, recommendations are generated for controlling various functions that are implemented by software applications. The respective recommendation that is used can be determined based on the previous user behavior in correlation with external parameters, such as the current time and the current location of the user. In addition, a probability value is determined for the situational relevance of the recommended control action. This probability value indicates whether the suggestion is suitable for the user at this time, or whether a control action by the user is probable based on the learned previous user behavior.

In the subsequent operation at 2, recommendations for different functions or software applications are displayed on a global display level at the same time. Display and control elements can be displayed, which only refer to different recommended applications at the present time. In addition, however, a recommendation for a specific control action of the recommended application, which at the present time is considered as the most likely, can also be given by the display and control elements.

If one of the display and control elements is activated by the user, then this is detected in the subsequent operation at 3. Thereupon, in operation at 4, the software application associated with the display and control element is opened. In operation at 5 the user is then presented with a variety of recommendations for these on an application level, for each of which display and control elements are displayed. An activation of one of the display and control elements displayed is detected in operation at 6, and then in operation at 7 leads to execution of the recommended control action for the opened software application. If the display and control elements displayed in operation at 2 already give a recommendation for a specific control action of the respective applications, then operations at 5 and 6 can also be skipped over and the recommended control action can be executed automatically after opening the application.

Figure 2:
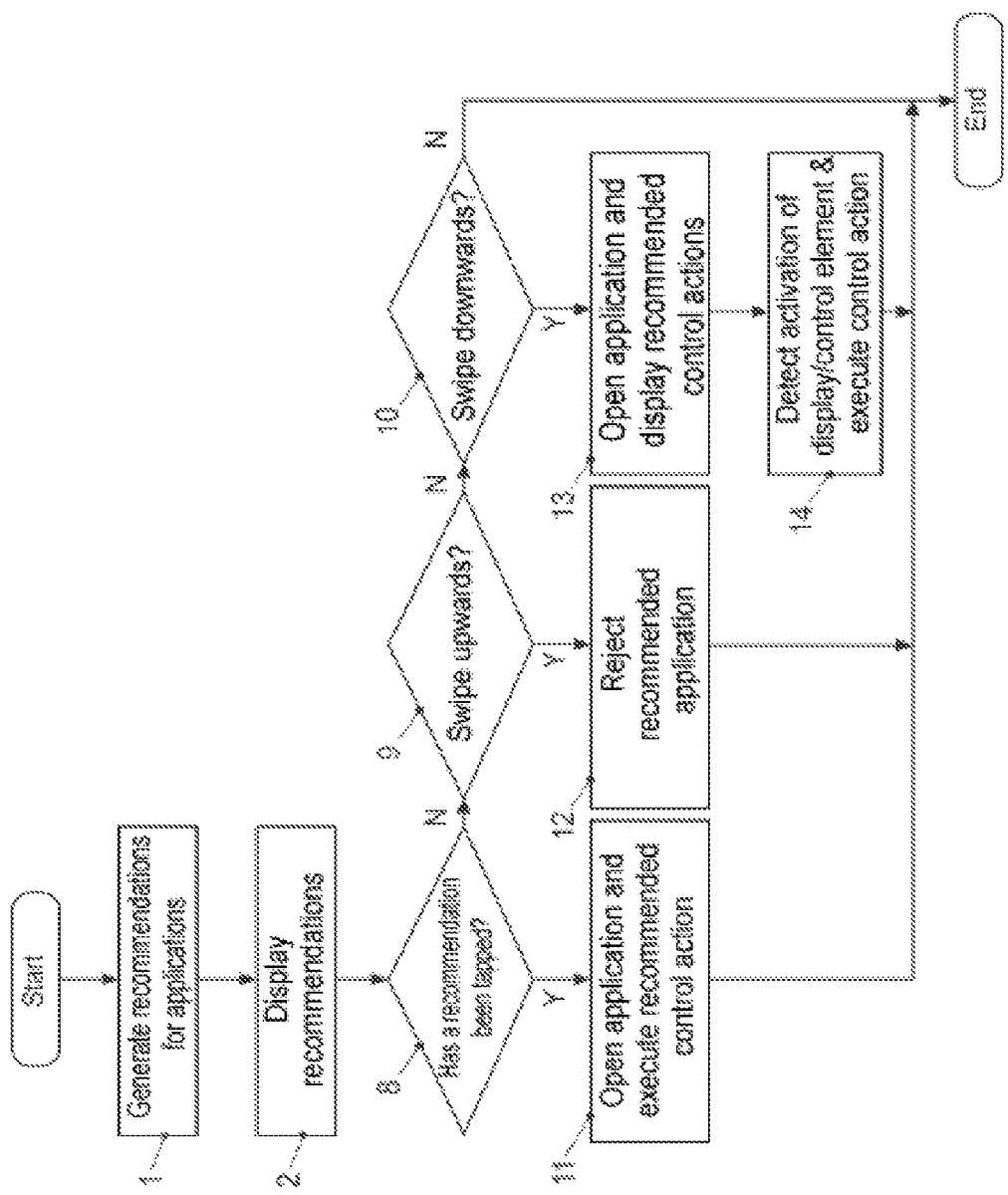
FIG. 2 shows a flow diagram of an embodiment of the method in connection with a touch-sensitive display.

FIG. 2 shows a flow diagram of an embodiment of the disclosed suggestion system in conjunction with a touch-sensitive display. The method operations at 1 and 2 correspond to those of FIG. 1, wherein the display and operating elements displayed on the global display level give both recommendations for applications as well as a control action for the recommended applications at the same time. The display and control elements displayed in this disclosed embodiment can be operated by the user by the latter touching the surface of the touch-sensitive display with one or more fingers. Likewise, an activation of the display and control elements can also be detected by a gesture recognition using suitable sensors in the region of the display, so that no actual contact with the display is then required.

If any of the display and control elements is activated, this will be detected and the nature of the activation evaluated. If the result of this evaluation obtained in operation at 8 is that the user has tapped the display and control element, then in operation at 11 both the recommendation for the application and for the control action of these applications is accepted. The recommended application is opened and the recommended control action is executed automatically. On the other hand, if the result of the evaluation in operation at 9 is that the user has performed a "swipe up" on the display and control element, then the recommended application is rejected in operation at 12. If the result of the evaluation obtained in operation at 10 should be that a "swipe down" was performed, then the recommended application is opened in operation at 13 and a plurality of recommendations for this application linked to corresponding display and control elements are displayed. If one of these display and control elements is then activated, for example, by tapping again, this is detected in operation at 14 and the recommended control action for this application is executed.

FIG. 3 shows a graphical user interface for the disclosed suggestion system. By way of example, reference is made to a use for an infotainment system of a transportation vehicle. The suggestion system in this case delivers recommendations for control actions of an infotainment system integrated in the transportation vehicle, but it can equally well be used, for example, for a driver assistance system of the transportation vehicle. The display of the graphical user interface can be used, for example, on a display arranged in a section of the central console, which is equipped as a touchscreen display.

Figure 3A:
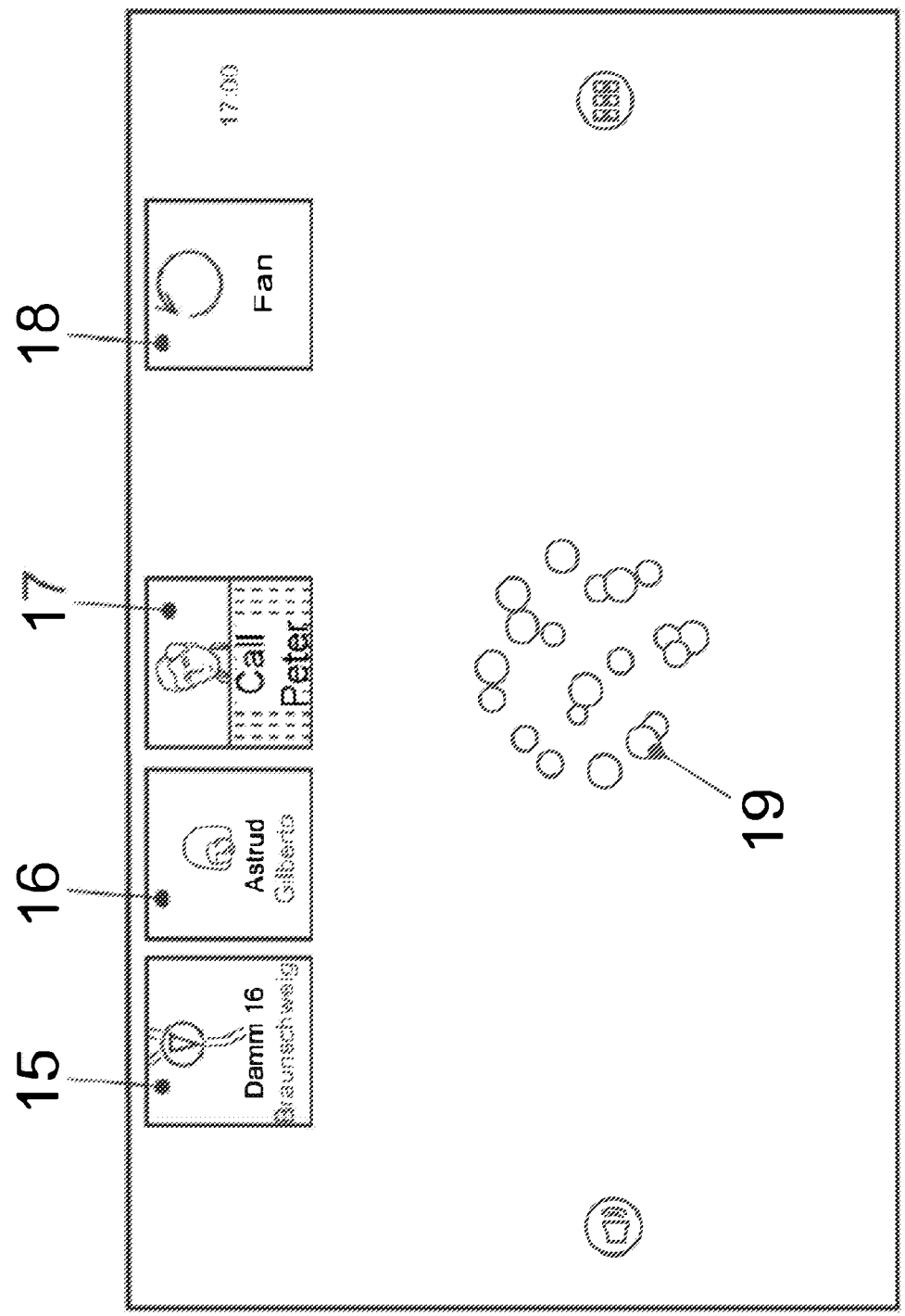
FIG. 3A shows a graphical user interface for a suggestion system in a transportation vehicle in which a plurality of recommendations are displayed on a global display level.

FIG. 3A shows a plurality of recommendations reproduced on a global display level of the display. For this purpose, display and control elements are displayed, which can be configured as an icon or a tile. By using suitable graphical symbols, possibly combined with a text instruction, in each case the thematic association with the recommended application and the suggested control action for the respective application is given. The icons or tiles can be arranged side by side in a recommendation bar.

For example, the recommendations can relate to a destination for the navigation, a title for the music playback or a telephone contact, and are represented by respective display and control elements 15, 16, 17. A display and control element 18 can also be provided, by which an automatically executed control action, for example, an automatic change of the air blower function, can be cancelled. Finally, an icon 19, for example, a cloud of spheres, can indicate that the suggestion system is active and recommendations are being given and, if necessary, can be executed. In the example shown, the suggestion system recommends calling the contact "Peter", for example, since the user has previously always done this on the same day of the week at the present time of day.

Figure 3B:
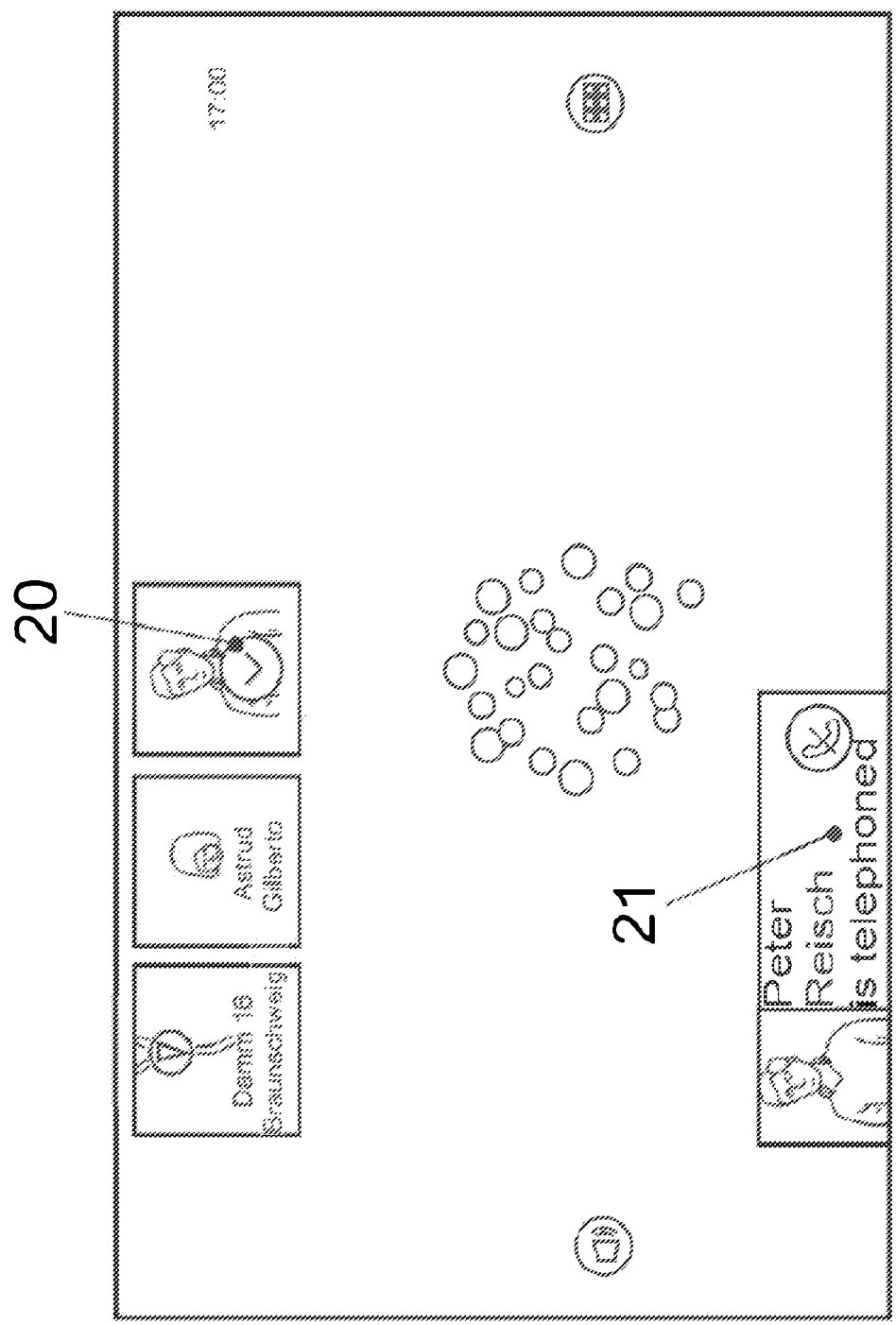
FIG. 3B shows the graphical user interface for a suggestion system in a transportation vehicle of FIG. 3A in which one of the recommendations is executed.

FIG. 3B shows the graphical user interface after this recommendation for the recommended telephone contact has been accepted by tapping on the display and control element. This is symbolized by an icon 20, for example, a tick, on the corresponding display and control element. In addition to, or instead, the display and control element can be changed either in its appearance or color. As a result of the selection by the user the telephone application becomes active and opens in a sub-window, for example, a so-called widget, at the bottom of the display, wherein the recommended telephone contact is automatically selected.

Figure 4A:
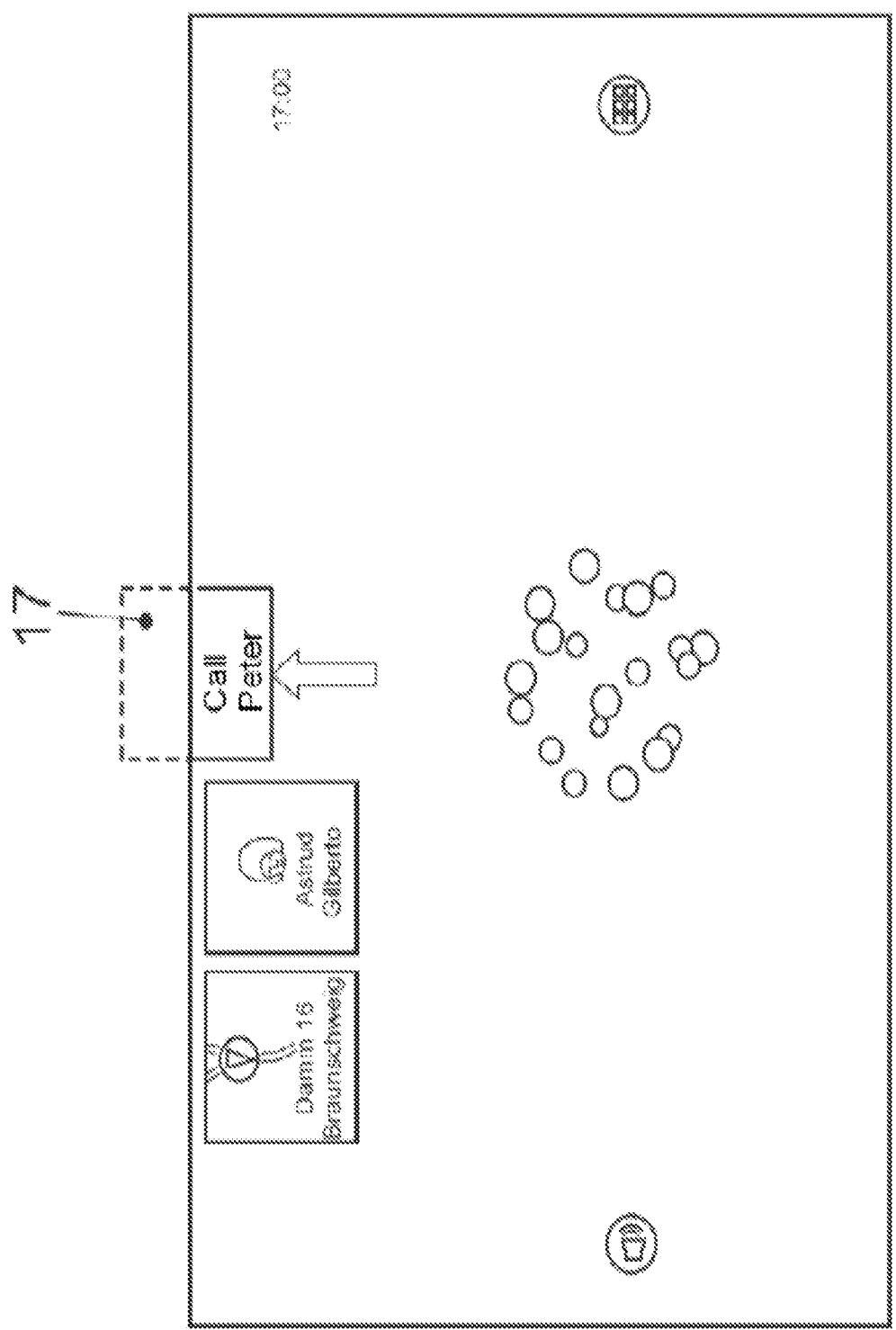
FIG. 4A shows the graphical user interface wherein a recommendation is rejected.

If the user would like to reject one of the recommendations displayed at the global display level, he/she may hide this by performing a swipe up movement on the associated display and control element 17, as shown in FIG. 4A. In this way, the clarity of the display is increased, since only recommendations of interest to the user will continue to be displayed. This also allows the suggestion system to display a different recommendation instead of the rejected recommendation without detracting from the clarity due to an increase in the number of recommendations.

Figure 4B:
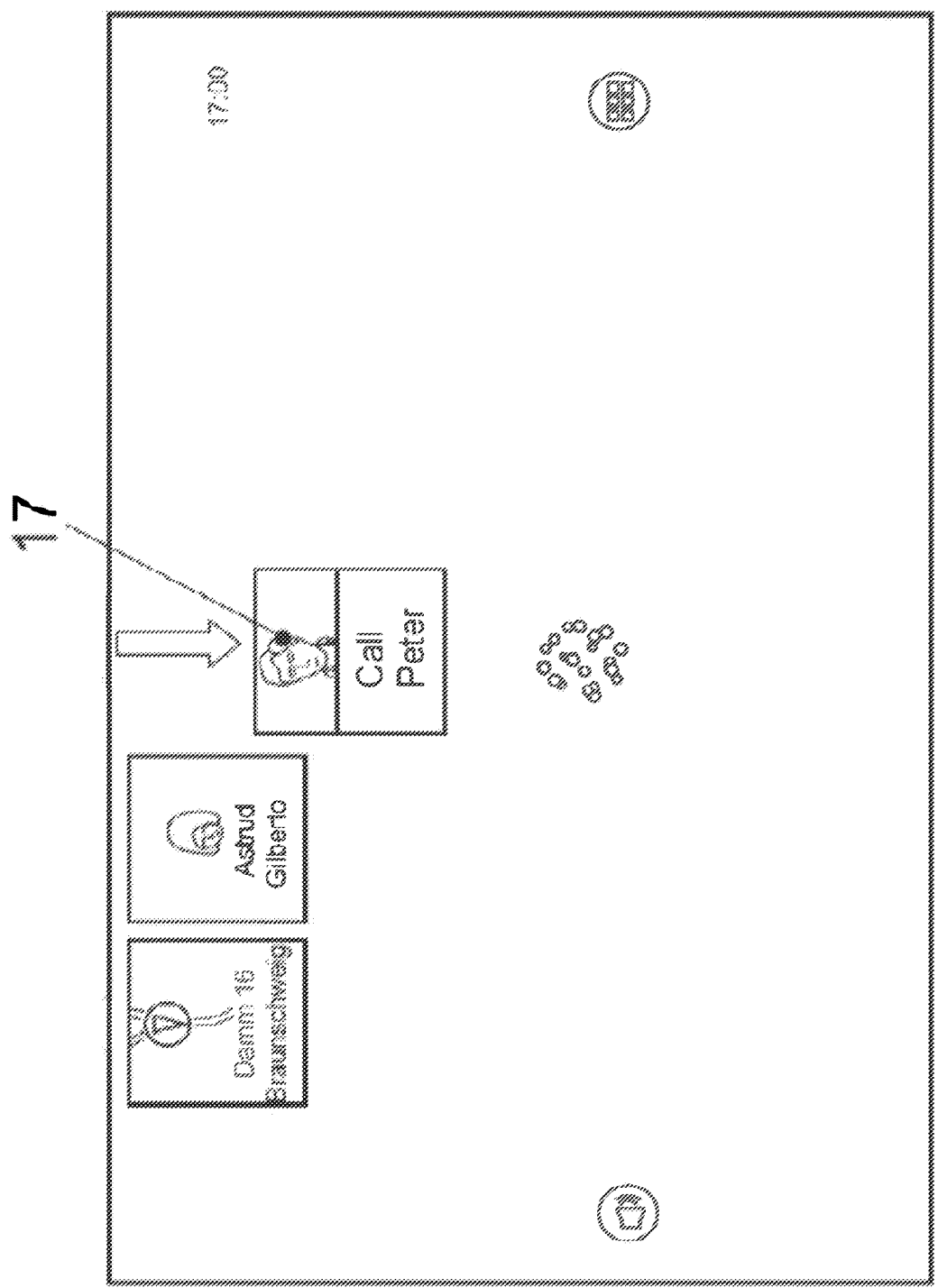
FIG. 4B shows the graphical user interface wherein an application of the recommendation is opened.

If the user would in fact like to use one of the recommended applications, but not perform the user action recommended for this application, then the user can open the corresponding application by performing a swipe down on the associated display and control element 17, as shown in FIG. 4B. In the above example, this means that the suggestion to perform a telephone call is perceived by the user as suitable; however, the user does not want to call the contact "Peter" but another contact.

Figure 5:
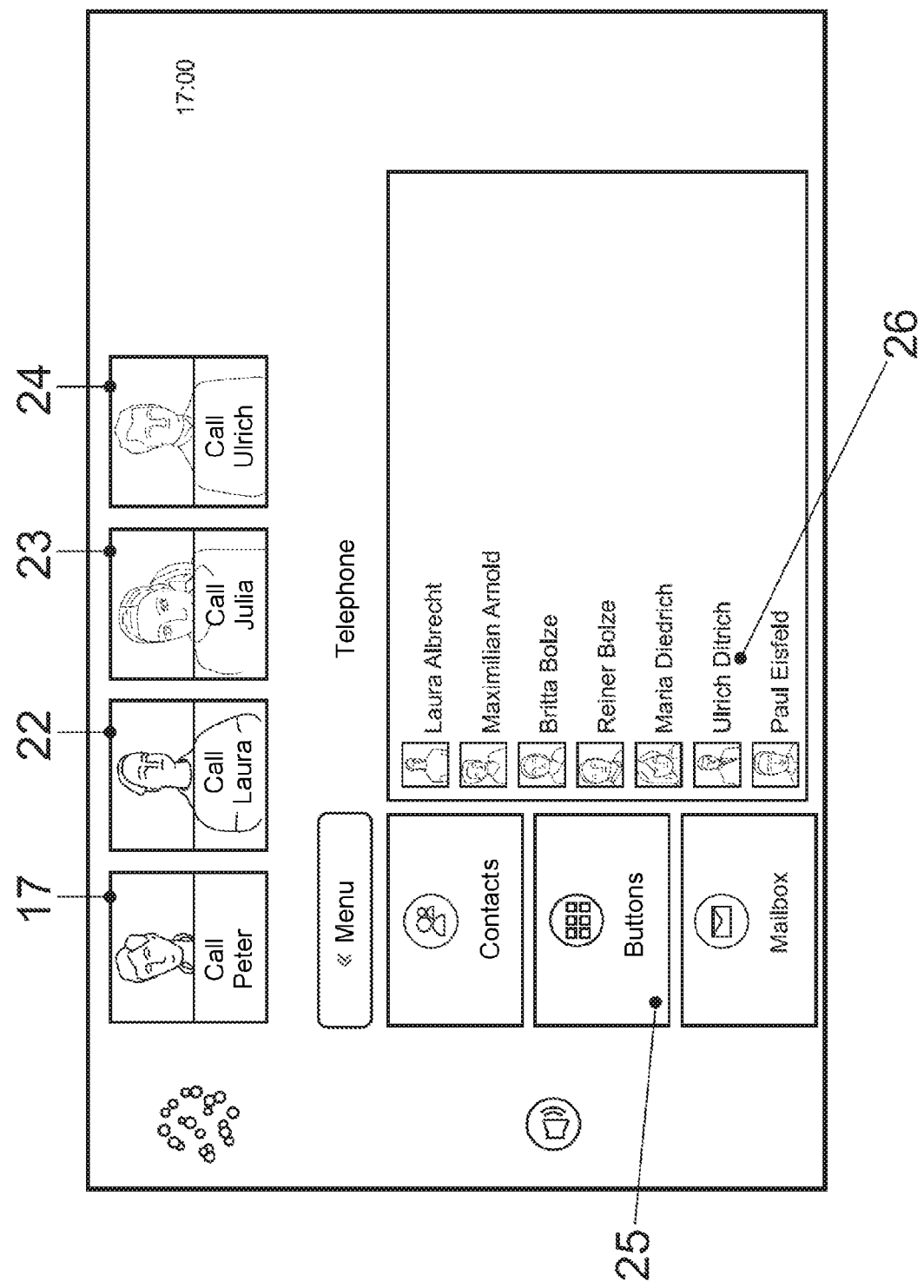
FIG. 5 shows the graphical user interface wherein a plurality of recommendations for an opened application are displayed.

For the opened telephone application the suggestion system then shows a plurality of suggestions on the application display level, as shown in FIG. 5. The display and control element 17 for the suggestion to call the contact "Peter" continues to be displayed. Although this recommendation is currently not being followed, it will continue to be placed at the top of the list of recommendations. In addition, suggestions for further contacts, which the suggestion considers to be less suitable—but which nevertheless have a situational relevance for the user—are also listed and displayed and can be operated by appropriate display and control elements 22, 23, 24. The order of the display and control elements displayed at this stage is determined by the probability of their situational relevance. In addition, display and control elements 25 for other functions of the telephone application as well as a list 26 of all telephone contacts, for example, sorted in alphabetical order, can be displayed.

The suggestion system integrated into the transportation vehicle can support the user as required based on different types of information needs. Thus, the user's interests or earlier usage actions of the user can be used along with the current behavior of the user, which can be captured by a user observation using suitable sensors in the transportation vehicle. It can also be provided that in the case of the transportation vehicle being used by a plurality of users, a distinction between the users is made to learn and in future to take into account the user behavior of the various users separately, to be able to provide customized recommendations to the respective user. Furthermore, the current driving situation, for example, based on transportation vehicle parameters such as the current speed, or the current environment of the transportation vehicle, can be taken into account by sensors attached to the outside of the transportation vehicle.

Figure 6:
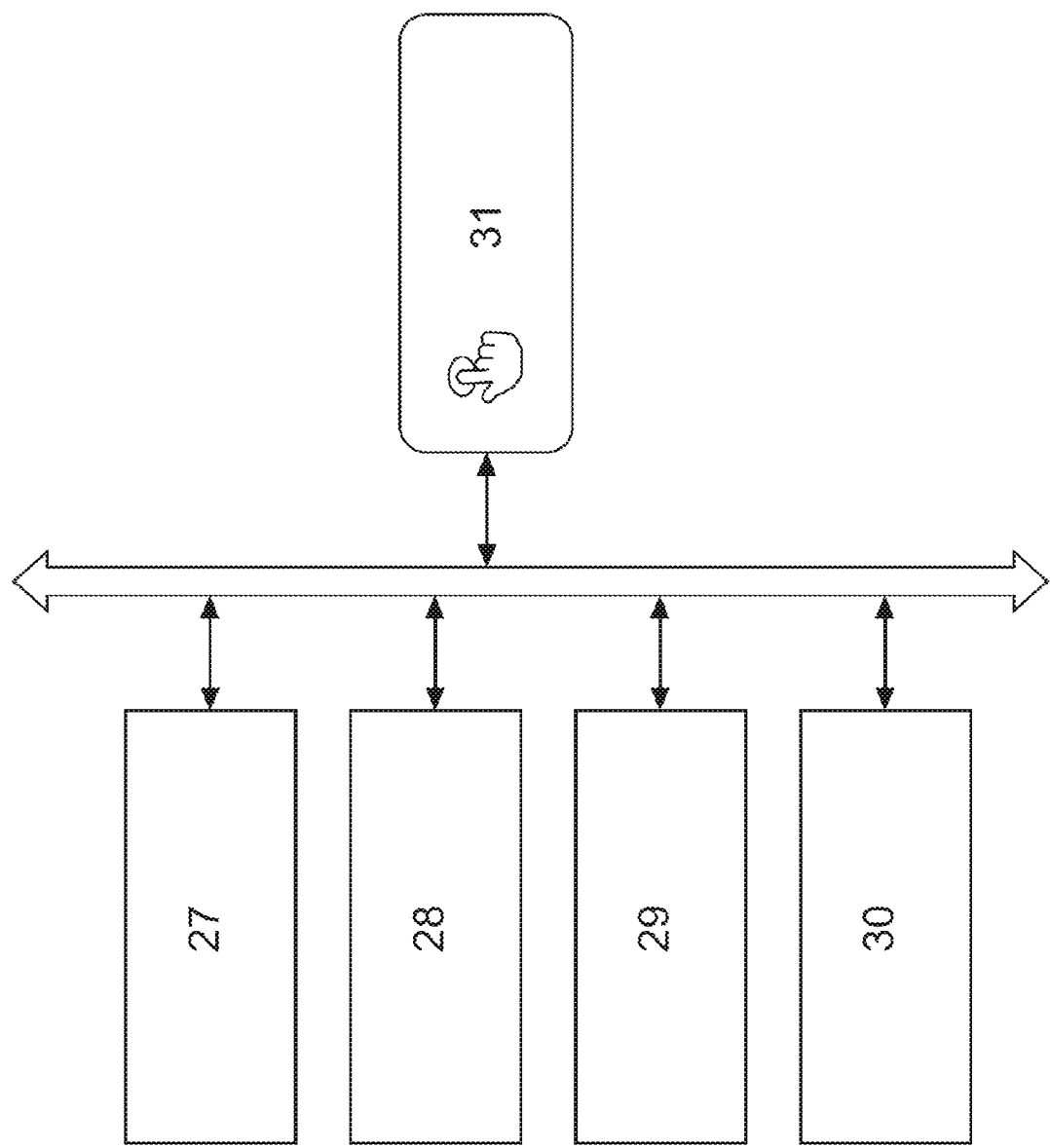
FIG. 6 shows a schematic block circuit diagram of a disclosed device.

FIG. 6 shows a schematic illustration of the disclosed device. A recommendation unit 27 generates recommendations for two or more software applications and also determines probability values for the recommended control actions. The recommendation unit 27 can have different parameters fed into it for the purpose, such as the current time or the current location of the transportation vehicle, the current driving situation or the currently detected user behavior. Similarly, the recommendation unit can access information on the already learned user behavior which may be stored, for example, in a database in a transportation vehicle-internal or transportation vehicle-external memory. An image generation unit 28 controls a touch-screen display 31 such that display and control elements for the recommendations of the software applications or the recommended control actions are displayed for the opened software application. Touching the surface of the touchscreen display 31 in the area of a display and control element displayed is detected by a detection unit 30, which supplies information about this to the computer unit 29, which opens the corresponding software application as appropriate and activates the image generation unit 28 to adapt the display accordingly.

The disclosed embodiments can be used in the area of automotive engineering, but is by no means limited thereto. Rather, the disclosed embodiments can be used in any computer-based systems that involve an interaction with a suggestion system for control actions in combination with a graphical user interface.

LIST OF REFERENCE NUMERALS 1 method operation with generation of recommendations for a plurality of software applications
2 method operation with display of the generated recommendations
3 method operation with detection of the activation of a display and control element of a recommended software application
4 method operation with opening of a software application
5 method operation with display of recommendations for the opened software application
6 method operation with detection of the activation of a display and control element of a recommended control action
7 method operation with execution of a recommended control action
8 method operation with determination of the tapping on a recommendation
9 method operation with determination of a swipe movement upwards
10 method operation with determination of a swipe movement downwards
11 method operation with opening of a software application and execution of the recommended control action
12 method operation with rejection of a recommended software application
13 method operation with opening of a software application and display of recommended control actions
14 method operation with detection of the activation of a display and control element assigned to the recommended operator action and execution of the selected control action
15, 16, 17, 22, 23, 24 display and control elements for recommendations
18 display and control element for cancelling an automatically executed control action
19 icon for active suggestion system
20 icon for selected recommendation
21 widget for telephone application
25 display and control elements for telephone application
26 list of telephone contacts
27 recommendation unit
28 image generation unit
29 computer unit
30 detection unit
31 touchscreen display

The invention claimed is:

1. A method for displaying suggested control actions of a suggestion system and for interaction with the suggestion system, the method comprising:
generating recommendations for two or more software applications;
displaying a first plurality of display and control elements based on the recommendations for the two or more software applications, wherein displaying the first plurality of display and control elements includes jointly displaying one display and control element for each recommendation of the recommendations of the two or more software applications on a global display level, wherein each jointly displayed display and control element displays a recommendation to open a software application of the two or more software applications and a recommended control action corresponding to the software application on the global display level;
detecting a user activation of one of the jointly displayed display and control elements;
in response to a first control action being detected as the user activation of the jointly displayed display and control element on the global display level:
opening the software application assigned to the activated display and control element and automatically executing the recommended control action for the software application; and
in response to a second control action different from the first control action being detected as the activation of the jointly displayed display and control element on the global display level:
opening the software application assigned to the activated display and control element without executing the recommended control action for the software application; and
displaying a second plurality of display and control elements corresponding to the software application on an application display level subordinate to the global display level, wherein each display and control element of the second plurality of display and control elements represents one of a plurality of recommended control actions, including the recommended control action that was originally displayed on the global display level, corresponding to the software application, wherein the second plurality of display and control elements are listed in an order according to probability values for execution of their respective recommended control actions in the software application, and wherein the recommended control action, corresponding to the software application, that was originally displayed on the global display level is listed first in the order due to having a highest probability value for execution in the software application.

2. The method of claim 1, wherein recommendations for control actions of the two or more software applications are generated, a respective probability value for the execution of a respective recommended control action is determined and in each case a display and control element, which represents the recommended control action with a highest current probability value for the respective software application, is displayed on the global display level for the two or more software applications.

3. The method of claim 1, further comprising:
rejecting the software application in response to a third control action different from the first and second control actions that being detected as the user activation of the display and control element on the global display level.

4. The method of claim 3, wherein the probability values for execution of their respective recommended control actions are determined based on previous user behavior and/or external parameters.

5. The method of claim 4, wherein the external parameters for determining the probability values comprise a current time and/or a current position of a user.

6. The method of claim 3, wherein the display and control elements are presented on a touch-sensitive display and the first control action corresponds to tapping on a presented display and control element, the third control action to an upward swipe movement and the second control action to a downward swipe movement on a presented display and control element.

7. A device for displaying recommended control actions of a suggestion system and interaction with the suggestion system, the device comprising:
a recommendation unit which generates recommendations for two or more software applications;
a display;
an image generation unit configured to control the display and configured to display a first plurality of display and control elements based on the recommendations for the two or more software applications, wherein displaying the first plurality of display and control elements includes jointly displaying one display and control element for each recommendation of the recommendations of the two or more software applications on a global display level, wherein each jointly displayed display and control element displays a recommendation to open a software application of the two or more software applications and a recommended control action corresponding to the software application on the global display level;
a detection unit which detects a user activation of one of the displayed display and control elements; and
a computer unit, configured to:
in response to a first control action being detected as the user activation of the jointly displayed display and control element on the global display level,
open the software application which is assigned to the activated display and control element and automatically execute the recommended control action for the software application, and
in response to a second control action different from the first control action being detected as the activation of the jointly displayed display and control element on the global display level,
open the software application which is assigned to the activated display and control element is opened on the computer unit without executing the recommended control action,
wherein the image generation unit is further configured to display a second plurality of display and control elements corresponding to the software application are displayed on an application display level subordinate to the global display level, wherein each display and control element of the second plurality of display and control elements represents one of a plurality of recommended control actions, including the recommended control action that was originally displayed on the global display level, corresponding to the software application, wherein the second plurality of display and control elements are listed in an order according to probability values for execution of their respective recommended control actions in the software application, and wherein the recommended control action, corresponding to the software application, that was originally displayed on the global display level is listed first in the order due to having a highest probability value for execution in the software application.

8. The device of claim 7, wherein the device is provided in a transportation vehicle and the suggestion system recommends control actions for an infotainment system of the transportation vehicle.

9. A transportation vehicle, comprising a device for displaying recommended control actions of a suggestion system and interaction with the suggestion system, the device comprising:
a recommendation unit which generates recommendations for two or more software applications;
a display;
an image generation unit configured to control the display and configured to display a first plurality of display and control elements based on the recommendations for the two or more software applications, wherein displaying the first plurality of display and control elements includes jointly displaying one display and control element for each recommendation of the recommendations of the two or more software applications on a global display level, wherein each jointly displayed display and control element displays a recommendation to open a software application of the two or more software applications and a recommended control action corresponding to the software application on the global display level;
a detection unit which detects a user activation of one of the displayed display and control elements; and
a computer unit configured to:
in response to a first control action being detected as the user activation of the jointly displayed display and control element on the global display level,
open the software application which is assigned to the activated display and control element and automatically execute the recommended control action for the software application, and
in response to a second control action different from the first control action being detected as the activation of the jointly displayed display and control element on the global display level,
open the software application which is assigned to the activated display and control element without executing the recommended control action, wherein the image generation unit is further configured to display a second plurality of display and control elements corresponding to the software application on an application display level subordinate to the global display level, wherein each display and control element of the second plurality of display and control elements represents one of a plurality of recommended control actions, including the recommended control action that was originally displayed on the global display level, corresponding to the software application, wherein the second plurality of display and control elements are listed in an order according to probability values for execution of their respective recommended control actions in the software application, and wherein the recommended control action, corresponding to the software application, that was originally displayed on the global display level is listed first in the order due to having a highest probability value for execution in the software application.

\* \* \* \* \*